(12) United States Patent
Xu et al.

(10) Patent No.: US 11,245,311 B2
(45) Date of Patent: Feb. 8, 2022

(54) POWER SUPPLY SYSTEM INSTALLED ON ROTATING OBJECT

(71) Applicant: CITIC Dicastal CO., LTD., Hebei (CN)

(72) Inventors: Zuo Xu, Qinhuangdao (CN); Minglei Li, Qinhuangdao (CN); Shiwen Xu, Qinhuangdao (CN); Yao Dai, Qinhuangdao (CN); Shaoqian Wang, Qinhuangdao (CN); Weidong Liu, Qinhuangdao (CN); Xi Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 77 days.

(21) Appl. No.: 16/804,859

(22) Filed: Feb. 28, 2020

(65) Prior Publication Data
US 2021/0167671 A1    Jun. 3, 2021

(30) Foreign Application Priority Data

Dec. 3, 2019 (CN) .......................... 201911222599.2

(51) Int. Cl.
| H02K 11/00 | (2016.01) |
| H02K 11/33 | (2016.01) |
| H02K 1/02 | (2006.01) |
| H02K 1/14 | (2006.01) |
| H02K 1/26 | (2006.01) |
| H02K 11/04 | (2016.01) |

(52) U.S. Cl.
CPC .......... *H02K 11/0094* (2013.01); *H02K 1/02* (2013.01); *H02K 1/14* (2013.01); *H02K 1/26* (2013.01); *H02K 11/046* (2013.01); *H02K 11/33* (2016.01)

(58) Field of Classification Search
CPC . H02K 11/00; H02K 1/02; H02K 1/14; H02K 1/26; H02K 11/04; H02K 11/33; H02K 11/046; H02K 21/22; H02K 7/1807; H02K 11/0094; H02K 3/28
See application file for complete search history.

(56) References Cited

U.S. PATENT DOCUMENTS

| 2008/0150294 A1* | 6/2008 | Jones ................... H02K 21/025 290/55 |
| 2016/0301348 A1* | 10/2016 | Mao ........................ H02P 25/18 |
| 2017/0276412 A1* | 9/2017 | Li ........................ F04D 13/0633 |

* cited by examiner

*Primary Examiner* — Naishadh N Desai
(74) *Attorney, Agent, or Firm* — Cooper Legal Group, LLC

(57) ABSTRACT

A power supply system installed on a rotating object includes: a power generation device, and a power management device for converting the electric power output by the power generation device to adapt to load requirements, in which the power generation device includes a rotor installed on and fixed to the rotating object, the rotor including at least one induction coil, and a stator which is rotatable relative to the rotor, the stator including at least two magnetic poles; the stator includes a stator case and a counterweight block, and the stator case surrounds the rotor from the circumferential direction of the rotor, and is closed in the circumferential direction; and the counterweight block is fixedly arranged at one side of the stator case, and the angle of the counterweight block in the circumferential direction is in the range of less than or equal to 180 degrees.

10 Claims, 7 Drawing Sheets

POWER SUPPLY SYSTEM INSTALLED ON ROTATING OBJECT

CROSS-REFERENCE TO RELATED APPLICATIONS

The present application claims benefit of Chinese Patent Application No. 201911222599.2, filed on Dec. 3, 2019the contents of which are hereby incorporated by reference in its entirety.

BACKGROUND

With the development of economy and the advancement of science and technology, intelligent transportation has become an important development direction of human life. How to dynamically obtain information about various components of the vehicle is an important part of intelligent transportation. For example, obtaining information about the wheels during running can make the vehicle run more safely. For another example, a display screen may be installed on the side of the wheel to display the information that the driver needs to display, etc.

However, at present, the facilities or display screens for obtaining wheel information are all electronic products, all of which need to work by relying on electrical energy, and continuous and reliable power supply of the wheels during continuous running has certain difficulties.

SUMMARY

The present disclosure relates to the technical fields of power generation and power supply, in particular to a power supply system installed on a rotating object.

In view of this, the embodiment of the present disclosure provides a power supply system installed on a rotating object, which can continuously and reliably supply power to an electronic product on a wheel.

To achieve the above object, an embodiment of the present disclosure provides a power supply system installed on a rotating object. The power supply system includes:

a power generation device; and a power management device for converting the electric power output by the power generation device to adapt to load requirements; in which the power generation device includes:

a rotor installed on and fixed to the rotating object, the rotor including at least one induction coil; and a stator which is rotatable relative to the rotor, the stator including at least two magnetic poles;

the stator includes a stator case and a counterweight block, the stator case surrounds the rotor from the circumferential direction of the rotor, and is closed in the circumferential direction; the counterweight block is fixedly arranged at one side of the stator case, and the angle of the counterweight block in the circumferential direction is in the range of less than or equal to 180 degrees;

when the rotating object rotates, the rotor rotates with the rotation of the rotating object, and the stator is kept stationary under the action of the gravity of the counterweight block.

In the above solution, the counterweight block is made of a tungsten alloy.

In the above solution, the stator case includes a base ring and at least two magnetic pole blocks, and the magnetic pole blocks are uniformly fixed to the inner wall of the base ring by an adhesive.

In the above solution, the magnetic pole blocks are distributed on the inner wall of the base ring in a wave shape, and each wave peak in the wave shape includes one magnetic pole block; and the magnetic pole blocks are uniformly distributed on the circumference of the inner wall of the base ring.

In the above solution, the rotor also includes a rotor core, the rotor core includes at least two coil slots for accommodating the induction coils, and each of the induction coils is wound in two or more adjacent coil slots; the inner side wall of each of the coil slots is an inwardly concave cambered surface; and the number of the coil slots corresponds to the number of the magnetic pole blocks.

In the above solution, the magnetic pole blocks are made of neodymium iron boron, and the induction coils are made of pure copper conductors.

In the above solution, the power management device includes a conversion component for converting the electric power output by the power generation device and performing voltage transformation, and the conversion component includes a rectifier bridge for converting the electric power output by the power generation device into direct current, and a switching power supply for performing step-down on the current output by the rectifier bridge; and one end of the rectifier bridge is connected to the power generation device, one end of the switching power supply is connected to the rectifier bridge, and the other end of the switching power supply is connected to a load.

In the above solution, the power management device also includes a monitoring component for monitoring the voltage of electric power output by the switching power supply, and a control component, the measuring terminal of the monitoring component is connected to the output line of the switching power supply, and the conversion component and the monitoring component are both connected to the control component.

In the above solution, the power management device also includes storage batteries for storing electric power output by the power generation device, and the input terminals of the storage batteries are connected to the switching power supply; each storage battery includes a plurality of output terminals, and the output terminals of the storage batteries are connected to the load; and the measuring terminal of the monitoring component is connected to a wire between the storage batteries and the load.

In the above solution, the output terminals of the storage batteries also include MOS transistors for automatically turning off the output of electric energy under a preset condition.

The power supply system installed on the rotating object according to the embodiment of the present disclosure includes: the power generation device, and the power management device for converting the electric power output by the power generation device to adapt to load requirements; the power generation device includes the rotor installed on and fixed to the rotating object, the rotor including at least one induction coil, and the stator which is rotatable relative to the rotor, the stator including at least two magnetic poles; the stator includes a stator case and a counterweight block, and the stator case surrounds the rotor from the circumferential direction of the rotor, and is closed in the circumferential direction; the counterweight block is fixedly arranged at one side of the stator case, and the angle of the counterweight block in the circumferential direction is in the range of less than or equal to 180 degrees. It can be seen that the power supply system installed on the rotating object according to the embodiment of the present disclosure, by arranging the counterweight block on the stator, keeps the stator stationary when the rotating object rotates, ensures the normal operation of the power generation device, and is capable of converting the electric power output by the power generation device to adapt to the load requirements, and can continuously and reliably supply power to an electronic product on the rotating object.

Other beneficial effects of the embodiments of the present disclosure will be further described in specific embodiments in combination with specific technical solutions.

BRIEF DESCRIPTION OF DRAWINGS

In order to explain the technical solutions in the embodiments of the present disclosure more clearly, the accompanying drawings used in the description of the embodiments will be briefly described below. It should be understood that the accompanying drawings described below are only a part of the embodiments of the present disclosure. For those of ordinary skill in the art, other accompanying drawings can be obtained based on these accompanying drawings without creative efforts.

DETAILED DESCRIPTION

Figure 1:
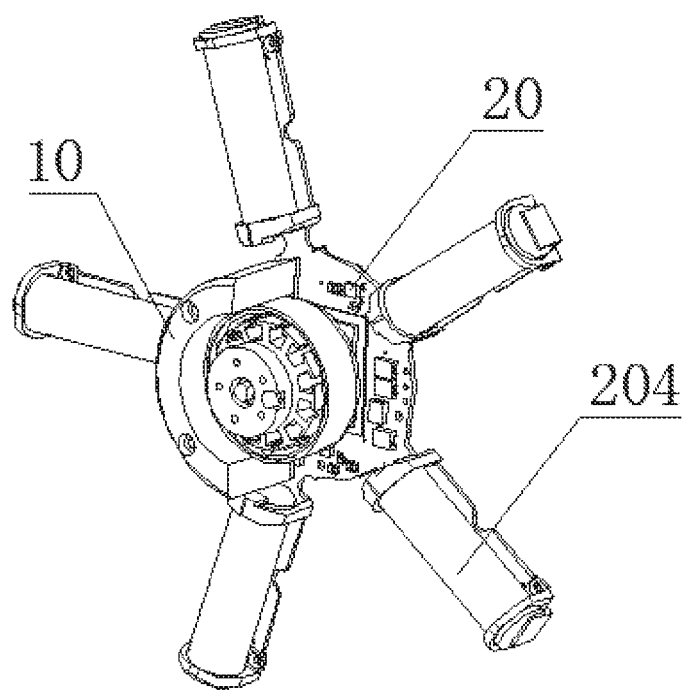
FIG. 1 is a schematic diagram of a power supply system installed on a wheel according to an embodiment of the present disclosure.

An embodiment of the present disclosure provides a power supply system installed on a rotating object. The power supply system includes:

a power generation device; and a power management device for converting the electric power output by the power generation device to adapt to load requirements; in which the power generation device includes:

a rotor installed on and fixed to a rotating object, the rotor including at least one induction coil; and a stator which is rotatable relative to the rotor, the stator including at least two magnetic poles;

the stator includes a stator case and a counterweight block, the stator case surrounds the rotor from the circumferential direction of the rotor, and is closed in the circumferential direction; the counterweight block is fixedly arranged at one side of the stator case, and the angle of the counterweight block weight in the circumferential direction is in the range of less than or equal to 180 degrees;

when the rotating object rotates, the rotor rotates with the rotation of the rotating object, and the stator is kept stationary under the action of the gravity of the counterweight block.

The power supply system installed on the rotating object according to the embodiment of the present disclosure, by arranging the counterweight block on the stator, keeps the stator stationary when the rotating object rotates, ensures the normal operation of the power generation device, and is capable of converting the electric power output by the power generation device to adapt to the load requirements, and can continuously and reliably supply power to an electronic product on the rotating object.

The rotating object herein mainly refers to an object rotating in the vertical direction, such as a wheel of a vehicle. In this way, the gravity of the counterweight block of the stator will play the biggest role. Of course, the rotating object is not limited to an object rotating in the vertical direction, for example, an object rotating obliquely or even rotating in the horizontal direction is also possible if the rotational speed is not high.

Furthermore, the stator is kept stationary under the action of the gravity of the counterweight block, which means that the stator does not move for most of the time, and may rotate for a short time at the moment when the wheels start to rotate, or suddenly accelerate or the road is rough and under other circumstances, but the circumstances do not affect the function of power generation.

In some other embodiments of the present disclosure, the counterweight block may be made of a tungsten alloy. Tungsten alloy has a larger specific gravity, thus can generate greater gravity and make the stator more stable, which is a better embodiment. More specifically, the counterweight block may be a high-density tungsten alloy which is made by adding a small number of elements such as Ni, Co and Mo into W serving as a matrix, and the high-density tungsten alloy is a typical two-phase alloy, and is also called a high specific gravity tungsten alloy. Those skilled in the art can understand that the counterweight block may also be made of other materials with a larger specific gravity.

In some other embodiments of the present disclosure, the stator case may include a base ring and at least two magnetic pole blocks, and the magnetic pole blocks are uniformly fixed to the inner wall of the base ring by an adhesive. More magnetic poles can generate more magnetic lines of force, and the entire magnetic ring is divided into a plurality of magnetic pole blocks to be manufactured respectively. The implementation process is better, which is a better embodiment. Specifically, the base ring may be made of a high-magnetoconductivity cold-rolled silicon steel sheet.

In some other embodiments of the present disclosure, the magnetic pole blocks may be distributed on the inner wall of the base ring in a wave shape, and each wave peak in the wave shape includes one magnetic pole block; the magnetic pole blocks are uniformly distributed on the circumference of the inner wall of the base ring. The wavy design is more suitable for the induction of the induction coil, which is a better embodiment.

In some other embodiments of the present disclosure, the rotor also includes a rotor core, and the rotor core includes at least two coil slots for accommodating induction coils, each of the induction coils is wound in two or more adjacent coil slots, and the number of the coil slots corresponds to the number of the magnetic pole blocks; and the inner side wall of each of the coil slots is an inwardly concave cambered surface. Herein, the inwardly concave cambered surfaces on the inner side walls of the coil slots have a gathering effect on the wires of the coils, so that the turns of the coil are closer and there is less magnetic flux leakage, which is a better embodiment.

In some other embodiments of the present disclosure, the rotor core may include twelve coil slots, three induction coils are provided and are respectively wound in ten adjacent coil slots, and the incoming lines and outgoing lines of the three induction coils are all staggered by one coil slot in turn; in this way, the current directions of the three induction coils are all different, that is, the three induction coils are a three-phase alternating current. The three-phase alternating current is a widely used electrical energy way that is easier for conversion and transmission, etc., which is a better embodiment.

In some other embodiments of the present disclosure, the magnetic pole blocks may be made of neodymium iron boron. The magnetic energy product of neodymium iron boron is relatively large, that is, a larger magnetic field can be generated per unit volume, so that the power generation efficiency of the power generation device is higher, which is a better embodiment.

In some other embodiments of the present disclosure, the induction coils may be made of pure copper conductors. The pure copper conductors have better electrical conductivity, which can reduce the amount of heat generated by the power generation device, which is a better embodiment.

In some other embodiments of the present disclosure, the power management device may include a conversion component for converting the electric power output by the power generation device and performing voltage transformation, and the conversion component includes a rectifier bridge for converting the electric power output by the power generation device into direct current, and a switching power supply for performing step-down on the current output by the rectifier bridge; one end of the rectifier bridge is connected to the power generation device, one end of the switching power supply is connected to the rectifier bridge, and the other end of the switching power supply is connected to a load. Since an electronic product generally uses direct current and has a lower voltage, the power supply system can better adapt to the electronic product by the conversion component, which is a better embodiment.

In some other embodiments of the present disclosure, the power management device may also include a monitoring component for monitoring the voltage of the electric power output by the switching power supply, and a control component, and the measuring terminal of the monitoring component is connected to the output line of the switching power supply, and the conversion component and the monitoring component are both connected to the control component. In this way, the output of electric energy and the electric energy input by the load can be made more stable, which is a better embodiment. Herein, the measuring terminal of the monitoring component is connected to the output line of the switching power supply, or the measuring terminal of the monitoring component may be connected to the input line of the load, because the output line of the switching power supply and the input line of the load are connected.

In some other embodiments of the present disclosure, the power management device may also include storage batteries for storing electric power output by the power generation device, and the input terminals of the storage batteries are connected to the switching power supply; each storage battery includes a plurality of output terminals, the output terminals of the storage batteries are connected to the load; the measuring terminal of the monitoring component is connected to a wire between the storage batteries and the load. In this way, because the electric energy is stored, the load uses electric power more stably, which is a better embodiment. Specifically, the storage batteries may be lithium batteries.

In some other embodiments of the present disclosure, the output terminals of the storage batteries also include metal-oxide semiconductor field effect transistors (MOS) for automatically turning off the output of electric energy under a preset condition. The MOS transistor is a voltage-controlled element, and its turn-on is like the saturated state of the transistor. The voltage drop of a turn-on junction is the smallest. As long as the required voltage is provided, it can be turned on, and it will be turned off by removing the control voltage. It is a very good switch, and the impact of on or off on the entire circuit is relatively small, which is a better embodiment.

The present disclosure is further described in detail below in conjunction with the accompanying drawings and specific embodiments hereinafter. It should be understood that the specific embodiments described herein are only used to explain the present disclosure and are not intended to limit the present disclosure. In addition, the embodiments described below are only a part of the embodiments of the present disclosure, but not all the embodiments. According to these embodiments, all other embodiments obtained by those of ordinary skill in the art without creative effort should fall within the protection scope of the present disclosure.

The embodiment provides a power supply system installed on a wheel, but those skilled in the art can understand that the power supply system according to the embodiment may also be installed on other rotating objects.

Figure 2:
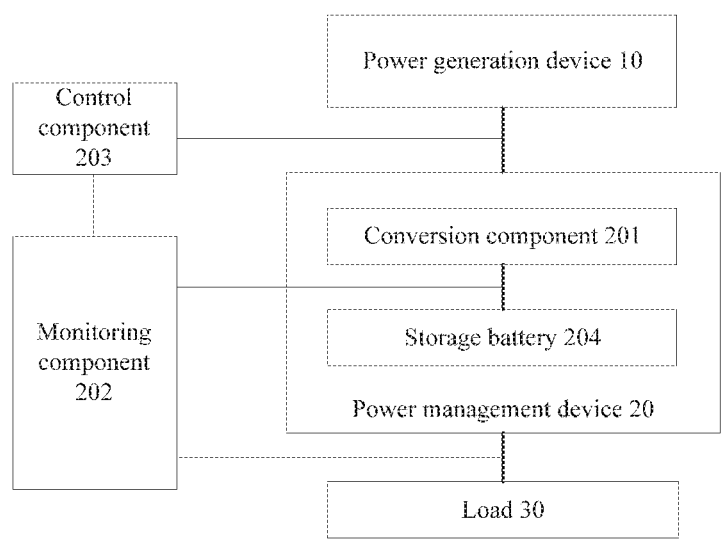
FIG. 2 is a schematic structural diagram of a power supply system installed on a wheel according to an embodiment of the present disclosure.
Figure 3:
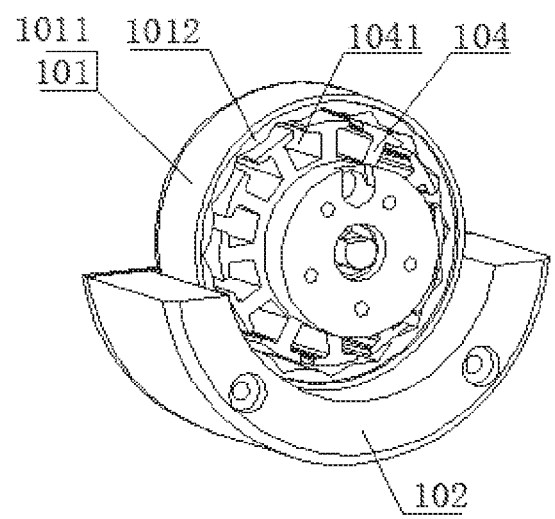
FIG. 3 is a schematic diagram of a power generation device in a power supply system installed on a wheel according to an embodiment of the present disclosure.
Figure 4:
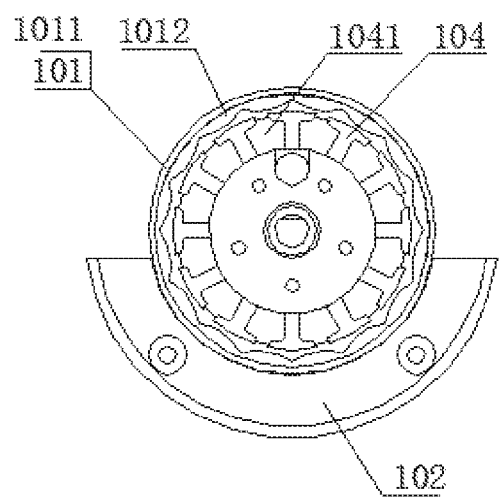
FIG. 4 is a schematic front projection diagram of FIG. 3.
Figure 5:
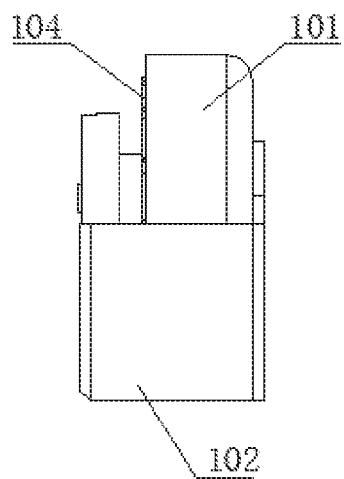
FIG. 5 is a schematic side projection diagram of FIG. 3.
Figure 6:
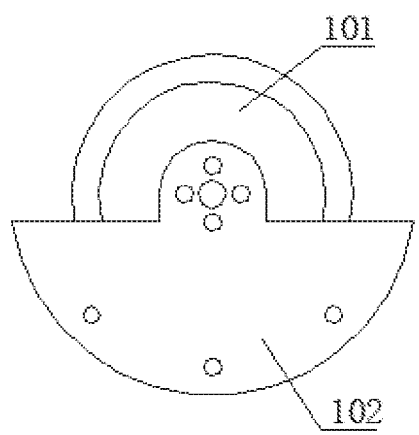
FIG. 6 is a schematic rear projection diagram of FIG. 3.
Figure 7:
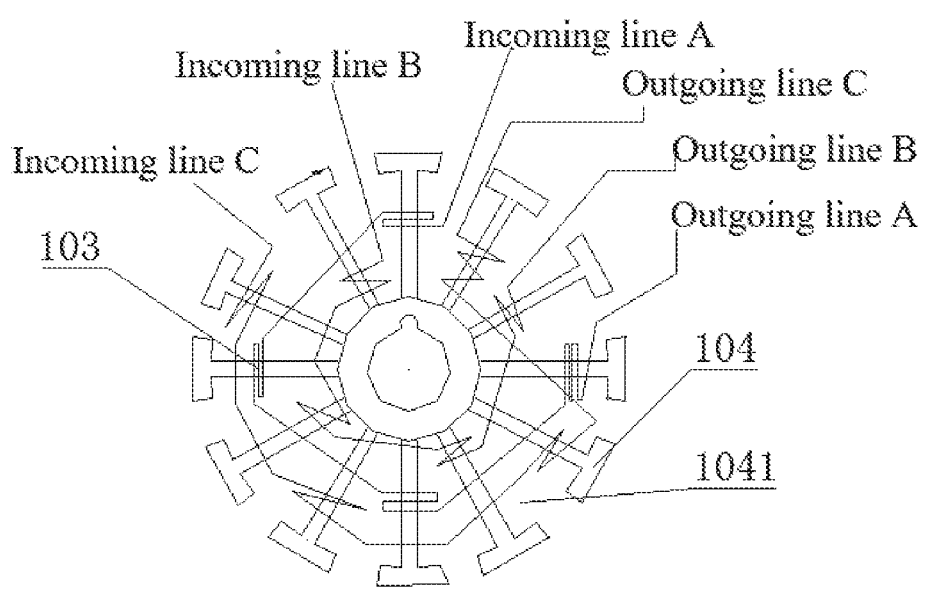
FIG. 7 is a schematic diagram of a rotor core in a power supply system installed on a wheel according to an embodiment of the present disclosure.

As shown in FIGS. 1 and 2, the power supply system installed on a rotating object includes: a power generation device 10 and a power management device 20; and the power management device 20 is used for converting the electric power output by the power generation device to adapt to load requirements.

As shown in FIGS. 3-7, the power generation device includes a rotor and a stator. The rotor is installed on and fixed to the wheel (not shown in the figure), the stator can rotate relative to the rotor, and the rotation center is the axis of the rotor.

The stator includes twelve magnetic poles, that is, many magnetic lines of force can be formed. The stator includes a stator case 101 and a counterweight block 102. The stator case 101 surrounds the rotor from the circumferential direction of the rotor, and is closed in the circumferential direction; and the counterweight block 102 is fixedly arranged at one side of the stator case 101, and the angle of the counterweight block 102 in the circumferential direction is in the range of 180 degrees.

The rotor includes three induction coils 103.

Those skilled in the art can understand that in other embodiments of the present disclosure, the number of the above induction coils 103, the number of the magnetic poles, and the angle range of the counterweight block 102 in the circumferential direction are not limited to those described above.

In an example, the counterweight block 102 is made of a tungsten alloy. In this way, greater gravity can be generated, and the stator is made more stable.

In an example, the stator case includes a base ring 1011 and twelve magnetic pole blocks 1012, and the magnetic pole blocks 1012 are uniformly fixed to the inner wall of the base ring 1011 by an adhesive. The magnetic pole blocks 1012 are distributed on the inner wall of the base ring in a wave shape, and each wave in the wave shape includes one magnetic pole block 1012; and the magnetic pole blocks 1012 are uniformly distributed on the circumference of the inner wall of the base ring.

In an example, the rotor also includes a rotor core 104, and the rotor core 104 includes twelve coil slots 1041. Each of the induction coils 103 is wound in ten adjacent coil slots 1041, and the incoming lines and outgoing lines of the three induction coils 103 are all staggered by one coil slot in turn, and the three induction coils 103 are respectively A, B, and C. The induction coils 103 have incoming lines and outgoing lines, namely, an incoming line A, an outgoing lines A, an incoming line B, an outgoing lines B, an incoming line C, and an outgoing lines C. Specifically, the inner side wall of each of the coil slots 1041 is a cambered surface bent in the circumferential direction, so that the turns of the coil are closer and there is less magnetic flux leakage.

In an example, the magnetic pole blocks 1012 are made of neodymium iron boron. The generated magnetic field is stronger, which can improve the power generation efficiency.

In an example, the induction coils 103 are made of pure copper conductors. The pure copper has higher electrical conductivity, thus can reduce the amount of heat generated by power generation device.

As shown in FIG. 2, the power management device 20 includes a conversion component 201 for converting the electric power output by the power generation device 10 and performing voltage transformation. The conversion component 201 includes a rectifier bridge (not shown in the figure) for converting the electric power output by the power generation device 10 into direct current, and a switching power supply (not shown in the figure) for performing step-down on the current output by the rectifier bridge; and one end of the rectifier bridge is connected to the power generation device 10, one end of the switching power supply is connected to the rectifier bridge, and the other end of the switching power supply is connected to a load 30.

In an example, the power management device 20 also includes a monitoring component 202 for monitoring the voltage of the electric power output by the switching power supply, and a control component 203. The measuring terminal of the monitoring component 202 is connected to the output line of the switching power supply, and the conversion component 201 and the monitoring component 202 are both connected to the control component 203.

In an example, the power management device 20 also includes storage batteries 204 for storing the electric power output by the power generation device 10, and the input terminals of the storage batteries 204 are connected to the switching power supply; each storage battery 204 includes a plurality of output terminals, and the output terminals of the storage batteries 204 are connected to the load 30; and the measuring terminal of the monitoring component 202 is connected to a wire between the storage batteries 204 and the load 30. In the present embodiment, the storage batteries are polymer lithium batteries.

In an example, the output terminals of the storage batteries 204 also include MOS transistors (not shown in the figure) for automatically turning off the output of electric energy under a preset condition.

The invention claimed is:

1. A power supply system installed on a rotating object, wherein the power supply system comprises:
  a power generation device; and
  a power management device for converting the electric power output by the power generation device to adapt to load requirements; wherein
  the power generation device comprises:
  a rotor installed on and fixed to the rotating object, the rotor comprising at least one induction coil; and
  a stator which is rotatable relative to the rotor, the stator comprising at least two magnetic poles;
  the stator comprises a stator case and a counterweight block, the stator case surrounds the rotor from the circumferential direction of the rotor, and is closed in the circumferential direction; the counterweight block is fixedly arranged at one side of the stator case, and the angle of the counterweight block in the circumferential direction is in the range of less than or equal to 180 degrees;
  when the rotating object rotates, the rotor rotates with the rotation of the rotating object, and the stator is kept stationary under the action of the gravity of the counterweight block.

2. The power supply system installed on the rotating object according to claim 1, wherein the counterweight block is made of a tungsten alloy.

3. The power supply system installed on the rotating object according to claim 2, wherein the stator case comprises a base ring and at least two magnetic pole blocks, and the magnetic pole blocks are uniformly fixed to the inner wall of the base ring by an adhesive.

4. The power supply system installed on the rotating object according to claim 3, wherein the magnetic pole blocks are distributed on the inner wall of the base ring in a wave shape, and each wave peak in the wave shape comprises one magnetic pole block; and the magnetic pole blocks are uniformly distributed on the circumference of the inner wall of the base ring.

5. The power supply system installed on the rotating object according to claim 4, wherein the rotor also comprises a rotor core, the rotor core comprises at least two coil slots for accommodating the induction coils, and each of the induction coils is wound in two or more adjacent coil slots; the inner side wall of each of the coil slots is an inwardly concave cambered surface; and the number of the coil slots corresponds to the number of the magnetic pole blocks.

6. The power supply system installed on the rotating object according to claim 5, wherein the magnetic pole blocks are made of neodymium iron boron, and the induction coils are made of pure copper conductors.

7. The power supply system installed on the rotating object according to claim 1, wherein the power management device comprises a conversion component for converting the electric power output by the power generation device and performing voltage transformation, and the conversion component comprises a rectifier bridge for converting the electric power output by the power generation device into direct current and a switching power supply for performing step-down on the current output by the rectifier bridge; and one end of the rectifier bridge is connected to the power generation device, one end of the switching power supply is connected to the rectifier bridge, and the other end of the switching power supply is connected to a load.

8. The power supply system installed on the rotating object according to claim 7, wherein the power management device also comprises a monitoring component for monitoring the voltage of electric power output by the switching power supply, and a control component, the measuring terminal of the monitoring component is connected to the output line of the switching power supply, and the conversion component and the monitoring component are both connected to the control component.

9. The power supply system installed on the rotating object according to claim 8, wherein the power management device also comprises storage batteries for storing electric power output by the power generation device, and the input terminals of the storage batteries are connected to the switching power supply; each storage battery comprises a plurality of output terminals, and the output terminals of the storage batteries are connected to the load; and the measuring terminal of the monitoring component is connected to a wire between the storage batteries and the load.

10. The power supply system installed on the rotating object according to claim 9, wherein the output terminals of the storage batteries also comprise MOS transistors for automatically turning off the output of electric energy under a preset condition.

* * * * *